May 31, 1932.  S. B. MOTT  1,860,718
PACKAGE CONVEYING APPARATUS
Filed July 6, 1931
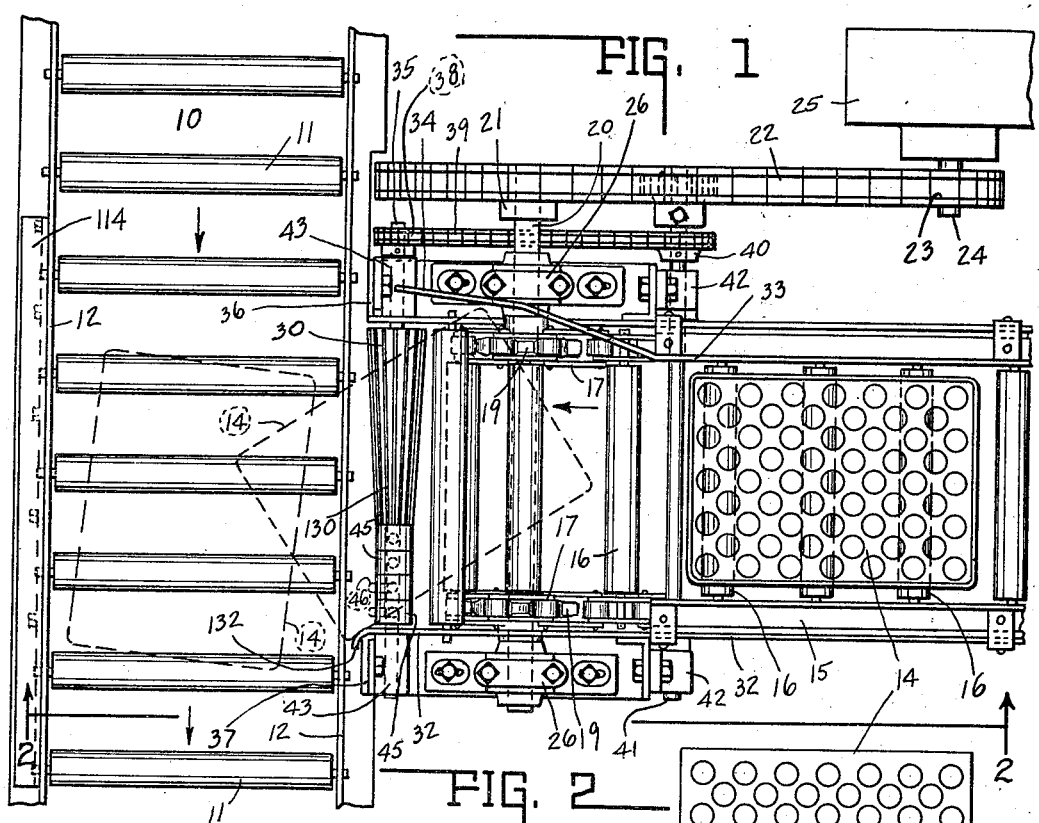

Patented May 31, 1932

1,860,718

UNITED STATES PATENT OFFICE

SAMUEL B. MOTT, OF NOBLESVILLE, INDIANA, ASSIGNOR TO INDIANA CONDENSED MILK COMPANY, OF INDIANAPOLIS, INDIANA, A CORPORATION

PACKAGE CONVEYING APPARATUS

Application filed July 6, 1931. Serial No. 548,726.

This is a conveying apparatus for conveying boxes, baskets, crates or other packages, and it is provided with means for effecting a sharp rectangular turn of the packages, which passes them from the end of one conveyor, at the adjacent side of another conveyor, upon the last mentioned conveyor.

The invention has been used in a system of roller conveyors in a factory for manufacturing milk products that are first packed in metal baskets, the baskets containing cans of different sizes traveling over different conveyors and being conveyed ultimately to one conveyor that leads to sterilizing apparatus. In this system, some of the baskets come to the main conveyor from a branch conveyor that terminates at the side of the main conveyor and at that point it is desired to effect a sharp rectangular turn of the baskets from the branch conveyor to the main conveyor.

It is my understanding that the effecting of a sharp rectangular turn of the packages or baskets of substantially 90°, has not been accomplished heretofore and is the problem sought to be solved by this invention.

The chief feature of the invention consists in providing means at the end of the branch conveyor for holding or retarding one side of a basket or package, and rotary driven means for simultaneously engaging and advancing the opposite side of the basket or package to give to it the rectangular turning movement that will discharge it upon the main conveyor.

One feature of the invention consists in providing a rotary driven conical roller for engaging the bottom of the package or basket at one side for advancing it and turning the basket, in cooperation of other parts.

Another feature of the invention is in combining with the foregoing a round member, preferably having a very limited rotary movement, for holding the bottom of the package or basket on the side that is to be held or retarded while the opposite side is being advanced and turned.

The foregoing, with other features of the invention, will more fully appear from the following description and claims and the accompanying drawings:

Fig. 1 is a plan view of a portion of said conveying apparatus with a basket or package indicated by full and dotted lines in different stages of movement in being passed from one conveyor to the other. Fig. 2 is a view partially in section and partially in side elevation on the line 2—2 of Fig. 1 to illustrate the driving mechanism for the branch conveyor. Fig. 3 is a central longitudinal section of the package turning roller as shown in Fig. 1, parts being broken away. Fig. 4 is a central longitudinal section of a modified form of the conical part of said turning roller.

In the drawings there is shown a main gravity roller conveyor 10 having rollers 11 mounted in supports 12 on the frame 13, and having guard bars 114. Nothing is new in the construction of this conveyor and the baskets or packages travel along the conveyor by reason of gravity as the rollers 11 are not driven. However, the invention is not limited to a gravity or a roller conveyor as it might be used with a driven conveyor.

On said conveyor 10, which herein we will term the main conveyor, in the particular factory in which this invention has been used, metal baskets 14 containing one size of cans filled with evaporated milk, or other product, travels toward the sterilizing apparatus which is not here shown.

A branch conveyor 15 extends at a right angle to the portion of the main conveyor 10 herein presented and it terminates adjacent the side of said main conveyor substantially as shown. On this conveyor, baskets 14 containing different sized cans are moved in the direction of the arrow toward said main conveyor. This branch conveyor 15 is a driven conveyor and has rollers 16 mounted in an endless chain 17 traveling on a track 18. The chains travel over sprocket wheels 19 which have a shaft 20 on which a larger sprocket wheel 21 is secured that is driven by the sprocket chain 22, which, in turn, is driven by the small sprocket wheel 23 on the shaft 24 that is driven by suitable power imparted in a speed reducer 25. The shaft 20 is mounted in bearings 26 as seen in Fig. 2 which are mounted on the frame 27 adjacent to the side of the main conveyor.

A basket 14 is indicated in the right hand portion of Fig. 1 although in the factory in which the invention has been used, said basket is a metal skeleton basket with openings to permit the sterilization of the contents of the basket.

The problem was to provide means to give to the basket or packages 14 a sharp rectangular turn to enable them to be discharged from the branch conveyor to the main conveyor as indicated in Fig. 1. To accomplish that result, I have provided a conical driven roller 30 to engage the bottom of the basket or package at one side and give to it the turning movement, while the bottom at the opposite side of the basket is held or retarded by one or more circular members 45 near the side guard bar 32 of the branch conveyor. On the opposite side of the branch conveyor, the guard bar 33 has a portion 34 bent outwardly and secured in the position shown in Fig. 1 so as to enable the basket or package to make the turn.

The turning roller 30 is not only conical but its surface is formed so as to frictionally engage the bottom of the basket or package 14 and effect the turning movement. As shown in Figs. 1 and 3, the surface of said turning roller 30 is provided with longitudinal flutes 130 but the invention is not limited to such construction.

A modified form of said roller 30 is shown in Fig. 4 where its surface is covered with a layer of rubber, canvas or leather 230 which will have much the same effect as the flutes 130 by way of frictionally engaging and turning the basket or package 14.

Said turning roller 30 is secured on a shaft 35 as seen in Fig. 3 and it has bearings 43 at its two ends on the frame members 36 and 37, and it is driven by a sprocket wheel 38 secured on said shaft 35 and a sprocket chain 39 extends from said sprocket wheel 38 to a sprocket wheel 40 on shaft 41 in bearings 42. The sprocket wheel 40 is mounted so as to be driven by the chain 22.

On the shaft 35 as seen in Fig. 3 there are a number of circular disks or members 45, but they are not driven members. These members 45 are individually permitted to have a slight yielding or rotatable movement limited by pins 46 that extend downward from them and which, in their oscillatory movement, engage the bottom of the frame member 12 which supports the rollers 11 of the main roller conveyor, as indicated by dotted lines in Figs. 1 and 2. The members 45 can be varied as to number and the pins 46 can be secured in any of them as desired. A stop pin 46 should be in each of said members 45 that is liable to be engaged by the bottom of the basket or package near the side edge thereof so as to retard or hold the same during return movement.

The basket or package 14 travels on the branch conveyor, as indicated in the right hand part of Fig. 1. When the advancing bottom edge of the basket or package meets the conical driven roller 30, it will start to turn the basket for at that time the opposite side has engaged one of the disks or members 45, which stops or retards the basket or package. The end of the guard bar 32 of the branch conveyor is bent at 132, as seen in Fig. 1 or otherwise formed so as not to interfere with and permit the turning movement of the basket or package. As the turning movement of the basket 14 progresses, it reaches the first dotted line position shown in Fig. 1 and further operation will move it entirely across to the main conveyor, as indicated in the second dotted line position in Fig. 1.

The relative position of the package or basket 14 and the parts of the means for giving it its rectangular turn is shown in Fig. 3 at the time that the advancing edge of the package first moves upon the turning roller. As there seen, one of the members 45 engages the bottom of the package at one side and holds or retards it, and the rotary conical roller 30 engages the bottom of the package or basket at the opposite side and gives it rapid advancing movement. The package or basket 14 between its two opposite sides is, therefore, out of contact with anything during the turning movement.

The invention claimed is:

1. A conveyor apparatus including two conveyors, one of which terminates at the side of and at a right angle to the other conveyor, means between said conveyors for engaging a package near one side thereof for retarding the same, and a driven conical roller between said conveyors for simultaneously engaging the package near the opposite side thereof and advancing the package and causing it to make a rectangular turn from one conveyor to the other conveyor.

2. A conveyor apparatus including a first roller conveyor, a second roller conveyor terminating at the side of and at a right angle to the first conveyor, means at the end of the second conveyor for retarding the packages at one side thereof, and a conical rotatable driven roller between the conveyors and parallel with the rollers of the second conveyor for engaging the packages at the opposite side thereof and giving them a rectangular turn from the branch conveyor to the main conveyor.

3. A conveyor apparatus including a first conveyor, a second conveyor terminating at the side of and at a right angle to the first conveyor, means at the end of the branch conveyor for frictionally retarding the packages at one side thereof, and a rotatable driven conical roller between the two conveyors with the surface thereof formed so as to frictionally engage the bottom of the packages at the opposite side thereof and cause the same to make a rectangular turn from the second conveyor to the first conveyor.

4. A conveyor apparatus including a main conveyor, a branch conveyor terminating at the side of and at a right angle to the main conveyor, means at the end of the branch conveyor for frictionally holding one side of the packages, and a rotatable driven conical roller with the surface provided with longitudinal flutes for engaging the bottom of the package at the opposite side thereof so as to cause the package to make a rectangular turn from the branch conveyor to the main conveyor.

5. A conveyor apparatus including a main conveyor, a branch conveyor terminating at the side of and at a right angle to the main conveyor, a driven shaft at the end of the branch conveyor parallel with the rollers of said conveyor, circular members mounted on said shaft near one end so as to be substantially stationary to engage the bottom of the package near one side thereof and retard its movement, and an enlarged conical member secured on the other end of said shaft having the surface adapted to frictionally engage the bottom of the package near the opposite side thereof and cause it to be rapidly advanced so as to give the package a rectangular turn as it leaves the branch conveyor and discharge it on the main conveyor.

6. A conveyor apparatus including a main roller conveyor, a branch roller conveyor terminating at the side of and at a right angle to the main conveyor, a driven shaft at the end of the branch conveyor parallel with the rollers of said conveyor, circular members mounted on said shaft near one end to engage the bottom of the package near one side thereof and retard its movement, pins extending from said circular members adapted to engage the frame of the main conveyor and prevent rotary movement, and a conical member secured on the other end of said shaft having the surface adapted to frictionally engage the bottom of the package near the opposite side thereof and cause it to be rapidly advanced so as to give the package the rectangular turn as it leaves the branch conveyor and discharge it on the main conveyor.

In witness whereof, I have hereunto affixed my signature.

SAMUEL B. MOTT.